United States Patent
Mehran et al.

(10) Patent No.: US 10,993,081 B2
(45) Date of Patent: Apr. 27, 2021

(54) LOCATION REPORTING IN A CELLULAR TELECOMMUNICATIONS NETWORK

(71) Applicant: BRITISH TELECOMMUNICATIONS PUBLIC LIMITED COMPANY, London (GB)

(72) Inventors: Farhad Mehran, London (GB); Richard Mackenzie, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/651,506

(22) PCT Filed: Aug. 6, 2018

(86) PCT No.: PCT/EP2018/071286
§ 371 (c)(1),
(2) Date: Mar. 27, 2020

(87) PCT Pub. No.: WO2019/063170
PCT Pub. Date: Apr. 4, 2019

(65) Prior Publication Data
US 2020/0267505 A1    Aug. 20, 2020

(30) Foreign Application Priority Data

Sep. 29, 2017   (EP) .................................... 17194228

(51) Int. Cl.
*H04W 4/029*   (2018.01)
*H04W 28/02*   (2009.01)

(52) U.S. Cl.
CPC ....... *H04W 4/029* (2018.02); *H04W 28/0289* (2013.01)

(58) Field of Classification Search
None
See application file for complete search history.

(56) References Cited

U.S. PATENT DOCUMENTS

| 6,061,337 A | 5/2000 | Light |
| 6,711,408 B1 * | 3/2004 | Raith .................... H04W 36/32 340/988 |

(Continued)

FOREIGN PATENT DOCUMENTS

| EP | 2750444 | 7/2014 |
| WO | WO 01/58182 | 8/2001 |

(Continued)

OTHER PUBLICATIONS

Great Britain Search Report, Application No. GB1715869.2, dated Feb. 28, 2018, 6 pages.

(Continued)

*Primary Examiner* — German Viana Di Prisco
(74) *Attorney, Agent, or Firm* — Patterson Thuente Pedersen, P.A.

(57) ABSTRACT

This disclosure relates to a method in a cellular telecommunications network, and a network node for implementing the method, the cellular telecommunications network including a base station having a coverage area, and a plurality of User Equipment (UE) located within the base station's coverage area, the method including instructing a first plurality of UEs to report their location; associating an occurrence of a connection performance indication for each UE of the first plurality of UEs with a reported location for that UE; defining a first geographical region in which the density of reported locations is above a first density threshold; defining a second geographical region in which the density of reported locations is above a second density threshold, wherein the area of the first geographical region is greater than the area of the second geographical region; instructing a second plurality of UEs within the first geographical region to report their location at a first reporting rate; and instructing a third plurality of UEs within the (Continued)

second geographical region to report their location at a second reporting rate.

9 Claims, 13 Drawing Sheets

(56) References Cited

U.S. PATENT DOCUMENTS

| | | | |
|---|---|---|---|
| 6,856,807 B1* | 2/2005 | Raith | G01S 19/34 455/434 |
| 7,697,479 B2* | 4/2010 | Metke | H04W 36/32 370/331 |
| 9,392,533 B1 | 7/2016 | Vivanco | |
| 2010/0124927 A1 | 5/2010 | Eskicioglu | |
| 2010/0289644 A1 | 11/2010 | Slavin | |
| 2012/0039365 A1 | 2/2012 | Suzuki | |
| 2012/0127876 A1 | 5/2012 | Hunukumbure | |
| 2013/0023281 A1 | 1/2013 | Meredith | |
| 2013/0336287 A1 | 12/2013 | Abraham | |
| 2014/0066092 A1 | 3/2014 | Scheim | |
| 2014/0133465 A1 | 5/2014 | Johansson | |
| 2014/0192698 A1* | 7/2014 | Anchan | H04W 4/06 370/312 |
| 2015/0282107 A1* | 10/2015 | Vrind | H04W 76/19 370/252 |
| 2016/0247330 A1 | 8/2016 | Rork | |
| 2018/0098258 A1* | 4/2018 | Annam | H04W 24/10 |
| 2019/0239105 A1* | 8/2019 | Futaki | H04W 64/006 |

FOREIGN PATENT DOCUMENTS

| | | |
|---|---|---|
| WO | WO 02/21478 | 3/2002 |
| WO | WO 2002021478 | 3/2002 |
| WO | WO 2010/135367 | 11/2010 |
| WO | WO 2012154112 | 11/2012 |
| WO | WO 2014/169343 | 10/2014 |
| WO | WO 2014161329 | 10/2014 |
| WO | WO 2016/141651 | 9/2016 |

OTHER PUBLICATIONS

Great Britain Search Report, Application No. GB1715853.6, dated Feb. 28, 2018, 6 pages.
Great Britain Search Report, Application No. GB1715869.2, dated Aug. 14, 2018, 3 pages.
Great Britain Response to Report Under Section 18(3), Application No. GB1715869.2, dated Aug. 31, 2018, 1 page.
Great Britain Response to Report Under Section 18(3), Application No. GB1715853.6, dated Aug. 14, 2018, 1 page.
International Search Report and Written Opinion, Application No. PCT/EP2018/071286, dated Sep. 3, 2018, 11 pages.
Rohde & Schwarz, LTE Location Based Services Technology Introduction White Paper, April 213, 22 pages.
European Search Report, Application No. 17194194.1, dated Dec. 5, 2017, 11 pages.
European Search Report, Application No. 17194228.7, dated Jan. 24, 2018, 9 pages.
Morten Tolsstrup, *Tunnel Radio Planning: Tunnel Coverage Solutions*, © 2011, 45 pages.
Open Mobile Alliance (OMA), Secure Plane Location Architecture, Approved Version 2.0 , Apr. 17, 2012, 51 pages.
Ilhan et al., *Design and Simulation of Intelligent Central Heating System for Smart Buildings in Smart City*, IEEE, © 2019, 5 pages.
Voloshin et al., *Smart Applications in Heat and Power System*, 2018, 42nd IEEE International Conference on Computer Software and Applications, 6 pages.
Del Peral-Rosado et al., *Survey of Cellular Mobile Radio Localization Methods: From 1G to 5G*, IEEE, vol. 20, No. 2, Second Quarter 2018, 25 pages.
Koesdwiady, *Recent Trends in Driver Safety Monitoring Systems: State of the Art and Challenges*, IEEE, vol. 66, No. 6, Jun. 2017, 14 pages.
Mylene Pischella, *Handover Probability Database for Optimization of Mobility between UMTS and WLAN*, IEEE 2006 proceedings, 5 pages.

* cited by examiner

LOCATION REPORTING IN A CELLULAR TELECOMMUNICATIONS NETWORK

PRIORITY CLAIM

The present application is a National Phase entry of PCT Application No. PCT/EP/2018/071286, filed Aug. 6, 2018, which claims priority from GB Patent Application No. 17194228.7, filed Sep. 29, 2017, each of which is hereby fully incorporated herein by reference.

TECHNICAL FIELD

The present disclosure relates to a cellular telecommunications network.

BACKGROUND

A cellular telecommunications network includes a plurality of base stations which each transmit wireless signals about a coverage area (typically called a "cell") to one or more User Equipment (UE). The base stations are also connected to a core network to interconnect the UE with the Internet and core network nodes (such as the Operations Support System (OSS)). In conventional cellular networks, this "backhaul" connection between the base station and the core network is typically via an Ethernet or optical fiber link, but in modern cellular networks this may be in part via a Digital Subscriber Line (DSL) connection (for example, if the base station is a "Home evolved Node B" (HeNB), also known as a small cell).

As each base station has a limited coverage area and UEs are normally mobile, cellular networking protocols have a defined process for UEs to disconnect from one base station and connect to another base station with seamless connectivity. This process is known as a "handover". A general overview of the handover process will now be described, which is divided into three phases—preparation, execution and completion. The UE is connected to a first base station of a plurality of base stations. The first base station is therefore the UE's "serving" base station, and the UE is configured to perform measurements of various parameters of its serving base station and of other base stations of the plurality of base stations. In the preparation phase, the serving base station provides one or more thresholds to the UE for the measurements. If the UE's measurements satisfy one or more of these thresholds, then a measurement report is sent from the UE to the serving base station, which triggers the handover of the UE to another base station. The serving base station determines which other base station should become the next serving base station for the UE based on the UE's measurement report. The serving base station and this target base station agree for the handover to take place. In the next phase, execution, the serving base station informs the UE that it should handover to the target base station. The UE will then connect to the target base station. In the completion phase, all routing of packets for the UE is changed to the target base station. The handover is then complete.

In certain scenarios, it is appropriate for the handover to be performed without the first step (preparation). This is often known as a "blind handover", in which the serving base station will instruct the UE to connect to a target base station without it being triggered by a UE measurement report satisfying a precondition. There is a greater chance that the blind handover is unsuccessful or the connection between the UE and the target base station won't adequately serve the UE's requirements when compared to a handover including the preparation phase. However, it may be more appropriate to perform a blind handover in scenarios where the UE's connection to its serving base station may rapidly deteriorate such that a full handover (including the preparation phase) may not have time to complete, such as when the UE enters a tunnel and there is a sudden decrease in signal strength between the UE and the serving base station.

A trigger for a blind handover may be based on the UE's location. For example, if it is determined that a UE is approaching a particular location where there is a sudden decrease in signal strength (e.g. the location of a tunnel entrance), then this may be used as a trigger for a blind handover in which the preparation phase is omitted and the serving base station instructs the UE to connect to the target base station (e.g. one positioned inside the tunnel). To perform blind handovers based on the location of the UE, then the location of the UE has to be determined. There are several techniques for determining the location of the UE. The most well-known is by using Global Navigation Satellite Systems (GNSS), such as the Global Positioning System (GPS). These produce very accurate estimates of the UE's location, but require greater UE radio and/or processing resources than other techniques as the UE performs both the measurements and the estimation of its position based on those measurements. Other techniques, such as Observed Time Difference of Arrival (OTDOA) and Enhanced Cell Identifier (E-CID), as defined in the $3^{rd}$ Generation Partnership Project (3GPP) Long Term Evolution (LTE) protocol (Release-9), require fewer UE radio/processing resources as the estimation of the UE's position may be performed by a Location Service Client (LCS) Server (LS). However, these techniques still require some UE radio/processing resources in order to perform the required measurements.

SUMMARY

According to a first aspect of the disclosure, there is provided a method in a cellular telecommunications network, the cellular telecommunications network including a base station having a coverage area, and further including a plurality of User Equipment (UE) located within the base station's coverage area, the method comprising: instructing a first plurality of UEs to report their location; associating an occurrence of a connection performance indication for each UE of the first plurality of UEs with a reported location for that UE; defining a first geographical region in which the density of reported locations is above a first density threshold; defining a second geographical region in which the density of reported locations is above a second density threshold, wherein the area of the first geographical region is greater than the area of the second geographical region; instructing a second plurality of UEs within the first geographical region to report their location at a first reporting rate; and instructing a third plurality of UEs within the second geographical region to report their location at a second reporting rate.

The method may further comprise determining that a count of occurrences of connection performance indications for one or more UEs of the plurality of UEs satisfies a threshold.

The connection performance indication may be a Radio Link Failure (RLF).

The method may be performed by a first base station. Alternatively, the method may be performed by a network node, wherein the network node is in communication with one or more base stations.

According to a second aspect of the disclosure, there is provided a computer program comprising instructions which, when the program is executed by a computer, cause the computer to carry out the method of the first aspect of the disclosure. The computer program may be stored on a computer-readable medium.

According to a third aspect of the disclosure, there is provided a network node for a cellular telecommunications network, the network including a plurality of User Equipment, UE, the network node comprising: a transceiver configured to receive data from the plurality of UEs; memory configured to store said data; and a processor configured to perform the method of the first aspect of the disclosure. The network node may be a base station.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
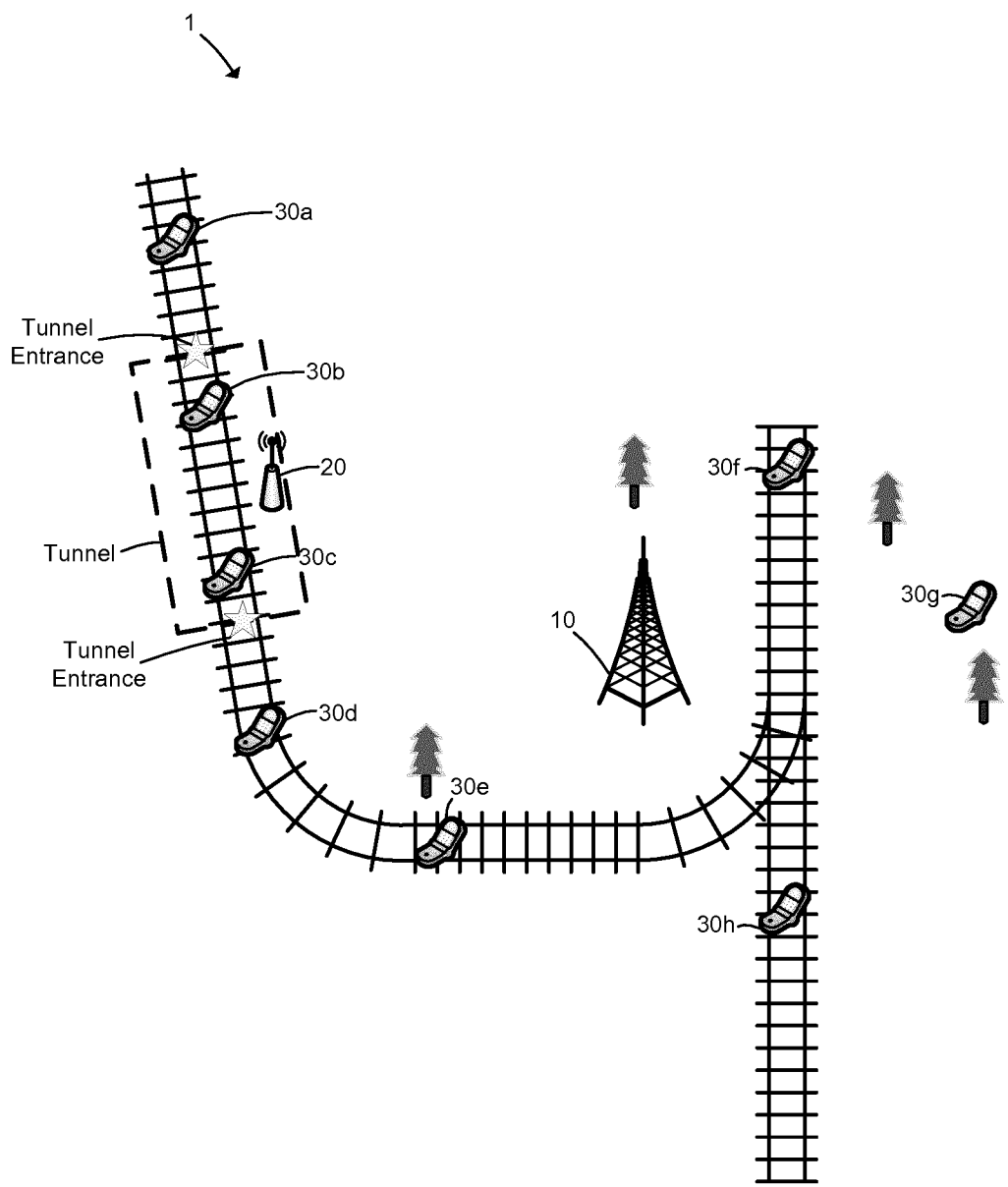
FIG. 1 is a schematic diagram of an embodiment of a cellular telecommunications network of the present disclosure.

A first embodiment of a cellular telecommunications network 1 will now be described with reference to FIGS. 1 to 6. FIG. 1 is an overhead map of an area having a first and second base station 10, 20 and a plurality of User Equipment (UE) 30a . . . 30h, several of which are travelling along a train line which passes through a tunnel. The first base station 10 is a macro base station having a relatively large coverage area compared to the second base station 20, which is a femto base station having a coverage area that includes the inside of the tunnel only.

Figure 2:
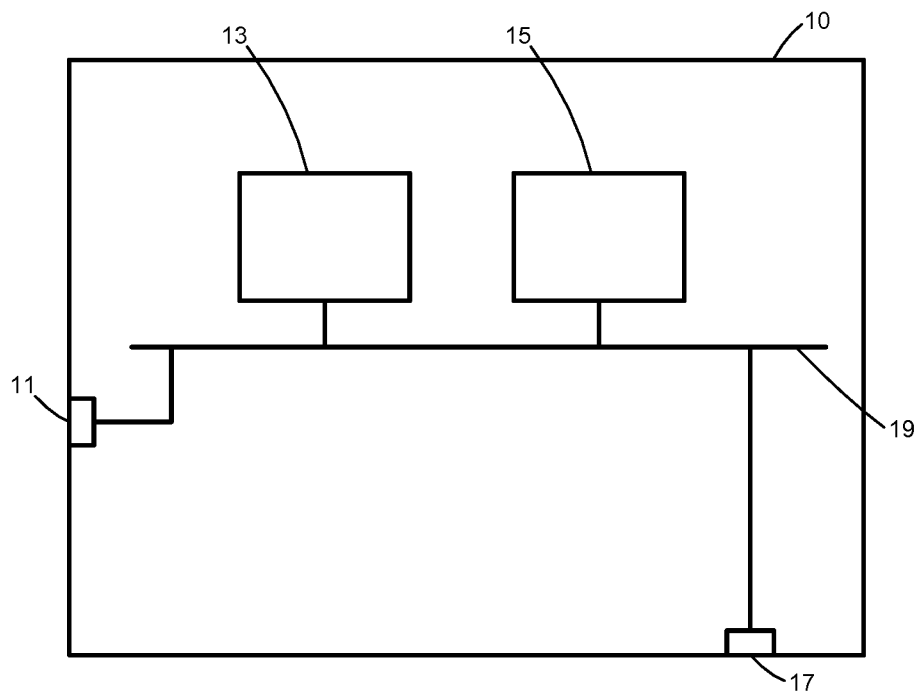
FIG. 2 is a schematic diagram of a base station of the network of FIG. 1.

A schematic diagram of the first base station 10 is illustrated in FIG. 2. The first base station 10 includes a first transceiver 11, a processor 13, memory 15 and a second transceiver 17, all connected via bus 19. The first transceiver 11 is an antenna configured for communication with any one of the plurality of User Equipment (UE) the Long Term Evolution (LTE) protocol. The second transceiver 17 is an optical fiber connection, which is used for communicating with one or more cellular core networking entities via the core connection and/or for communicating with one or more neighboring base stations (e.g. using an X2 message). The second base station 20 is of similar construction, but its components may be of a different form to be more suitable for short range communications (for example, a low-power antenna).

Figure 3:
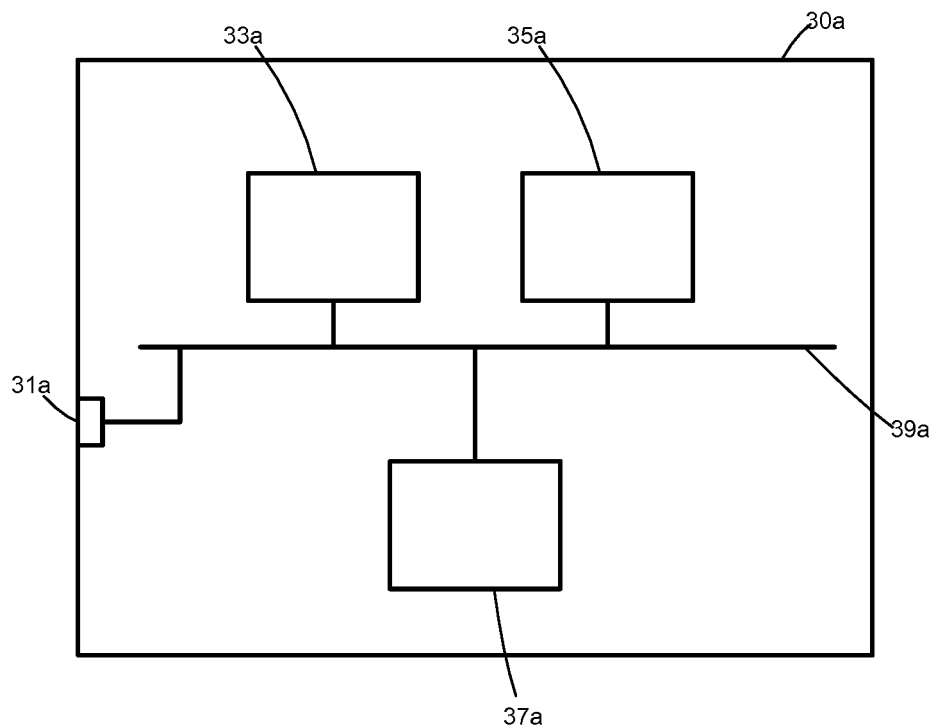
FIG. 3 is a schematic diagram of a User Equipment of the network of FIG. 1.

A schematic diagram of a first UE 30a of the plurality of UEs is shown in FIG. 3. The first UE 30a includes a first transceiver 31a, a processor 33a, memory 35a, display 37a (including a user interface), and Global Positioning System (GPS) receiver 38a, all connected via bus 39a. The first transceiver 31a is an antenna configured for communication with the first and/or second base station via the LTE protocol. In this embodiment, the UE is configured to measure its radio environment (using the antenna 31a and processor 33a) to determine the quality of the connection between the UE and one or both of the first and second base stations 10, 20. In particular, if the quality of the connection between the UE and its serving base station (that is, the base station which it is connected to) drops below an operator defined threshold, then an occurrence of a Radio Link Failure (RLF) is recorded (in memory 35a) and reported. Furthermore, the first UE 30a includes a GPS function, which is implemented by processor 33a and GPS receiver 38a, which allows the first UE 30a to determine its location. The other UEs of the plurality of UEs are of the same or similar form to the first UE 30a.

A first embodiment of a method of the present disclosure will now be described. In an initial arrangement of this example as shown in FIG. 1, all UEs of the plurality of UEs 30a . . . 30h are served by the first base station 10. All UEs of the plurality of UEs 30a . . . 30h are configured to determine their location (using a GPS function implemented by processor 33a and GPS receiver 38a) and report the determined location (together with a timestamp indicating the actual time the location was determined) to the first base station 10 at a first reporting rate. In this example, the first reporting rate is one location report every 10 minutes. The first base station 10 receives this report and stores the information (a UE identifier (e.g. International Mobile Subscriber Identifier (IMSI) or International Mobile Equipment Identifier (IMEI)), the UE's location (in GPS coordinates), and a timestamp associated with the UE's location) in memory 15.

Thus, each UE connected to the first base station 10 is configured to periodically report its location to the first base station 10, such that any new UE connecting to the first base station 10 is also configured in the same manner. It will be shown later in this description that the location reporting rate may be varied, but any UE will still report its location at at least the first reporting rate.

A subset of the plurality of UEs (30a, 30b, 30c, 30d, 30e, 30f) are on a train which passes through the tunnel, whilst the other UEs (30g, 30h) do not pass through the tunnel. Each UE of the subset of UEs 30a . . . 30f experiences a loss of service from the first base station 10 when it is located within the tunnel. Furthermore, in this example, the tunnel opening is so narrow, and the surrounding material so dense, that the first base station's signals attenuate rapidly at the tunnel entrances. These properties mean that a traditional handover (including the preparation phase) cannot be triggered and successfully completed before each UE enters the tunnel via either tunnel entrance and can no longer communicate with the first base station 10. Accordingly, each UE will record an RLF event in memory, which will be reported to the first base station 10 when it re-emerges from the tunnel and reconnects to the first base station 10.

Figure 4:
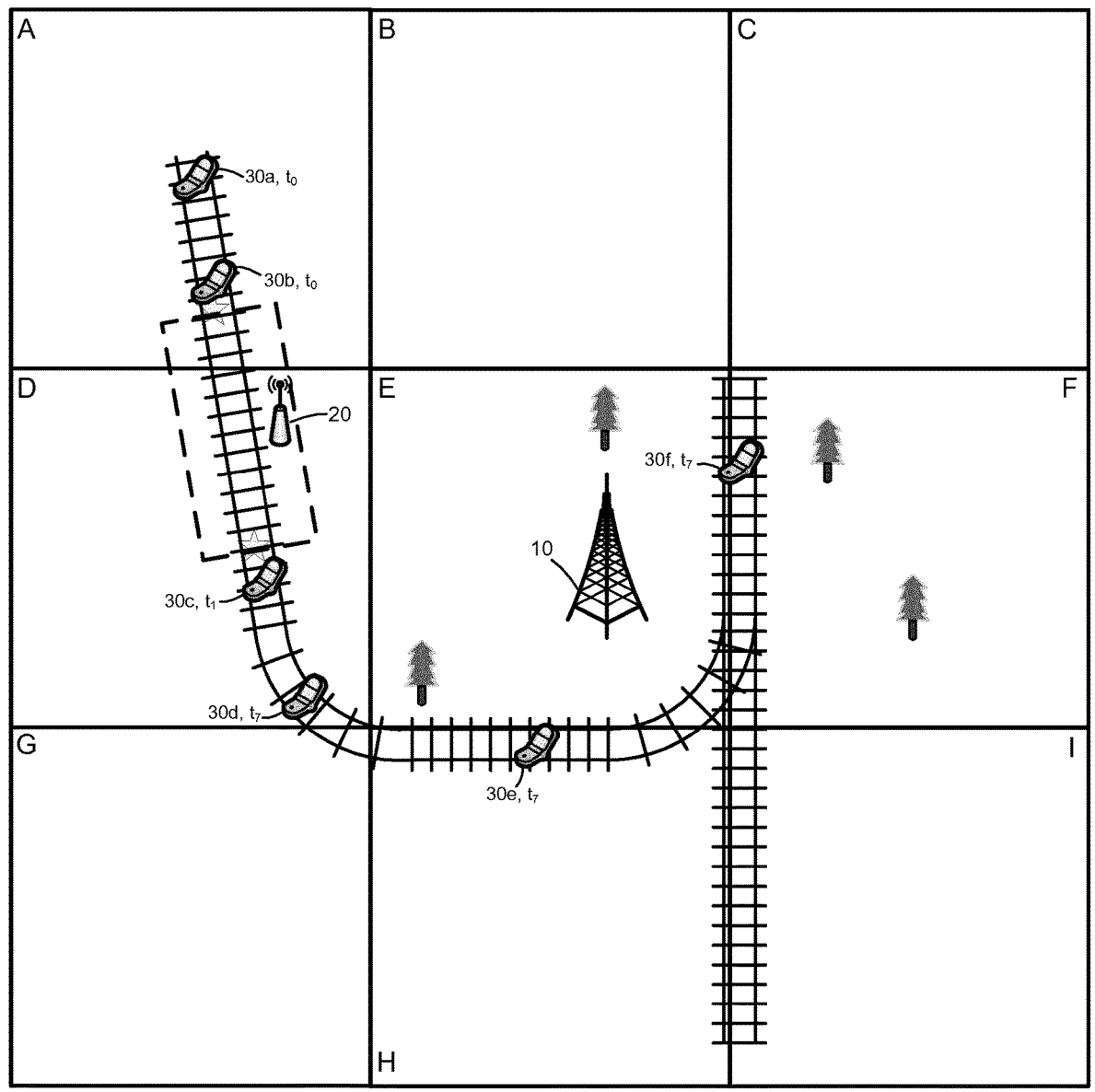
FIG. 4 is a schematic diagram of the network of FIG. 1, showing locations of RLF events overlaid onto a first grid.
Figure 5:
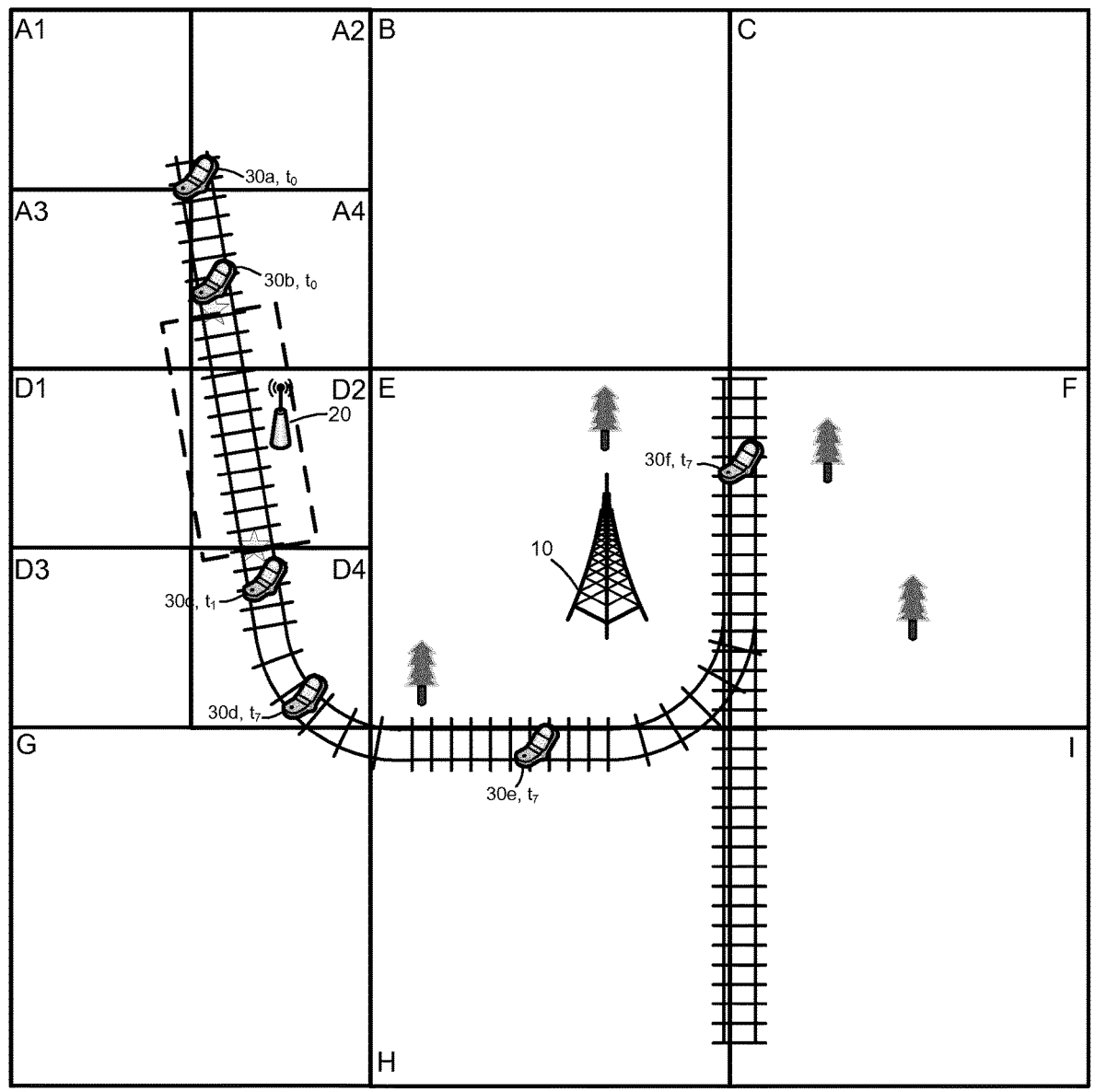
FIG. 5 is a schematic diagram of the network of FIG. 1, showing locations of RLF events overlaid onto a first and second grid.
Figure 6:
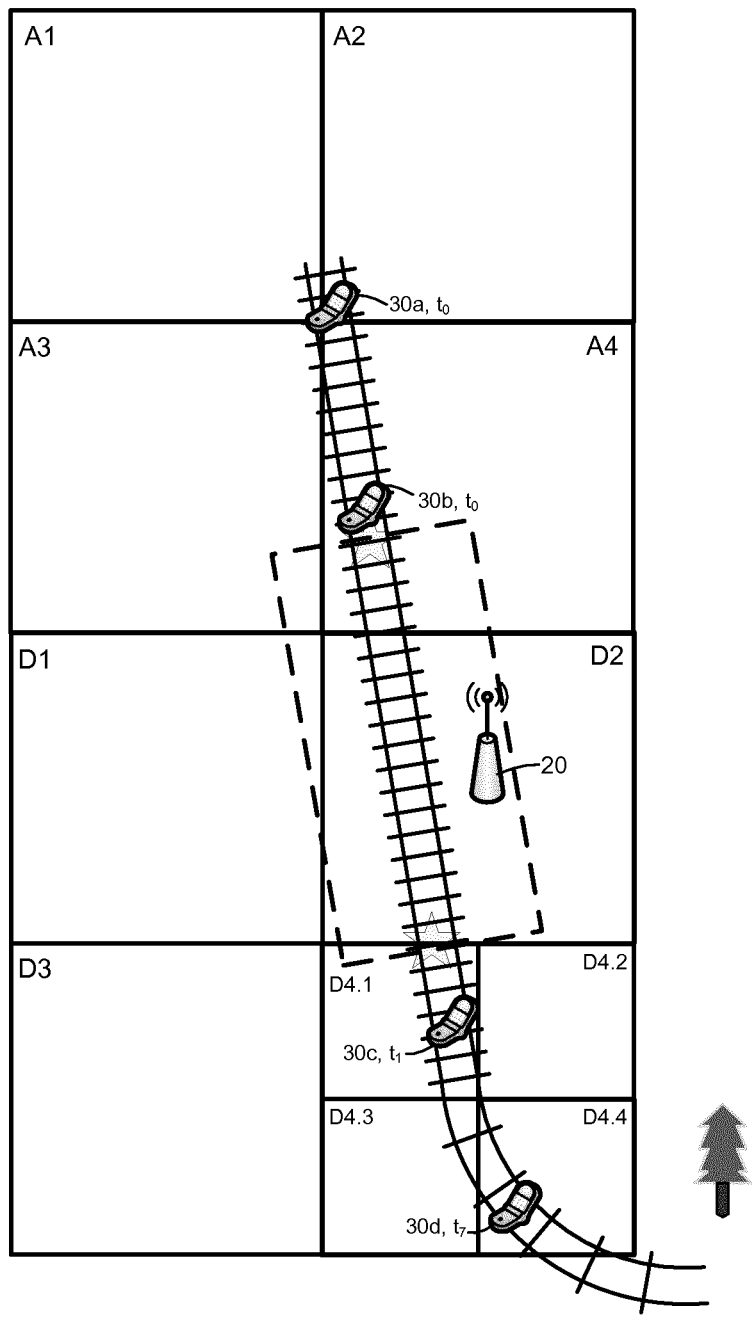
FIG. 6 is a schematic diagram of the network of FIG. 1, showing locations of RLF events overlaid onto a first, second and third grid.

The first base station 10 stores mapping data covering the area of FIG. 1. As shown in FIG. 4, the first base station 10 is configured to overlay a first grid onto this map, which defines nine coarse geographical regions (A to I). As shown in FIG. 5, the first base station 10 is also configured to overlay a second grid onto this map (only a portion of the second grid is shown for simplicity), which defines 36 fine geographical regions, in which each coarse geographical region of FIG. 4 is subdivided into four fine geographical regions (e.g. coarse geographical region A is subdivided into four fine geographical regions A1 to A4). As shown in FIG. 6, the first base station 10 is also configured to overlay a third grid onto this map (only a portion of the map and a portion of the third grid is shown for simplicity), which defines 144 very-fine geographical regions, in which each fine geographical region is further subdivided into four very-fine geographical regions (e.g. fine geographical region D4 is further subdivided into four very-fine geographical regions D4.1 to D4.4).

Figure 7:
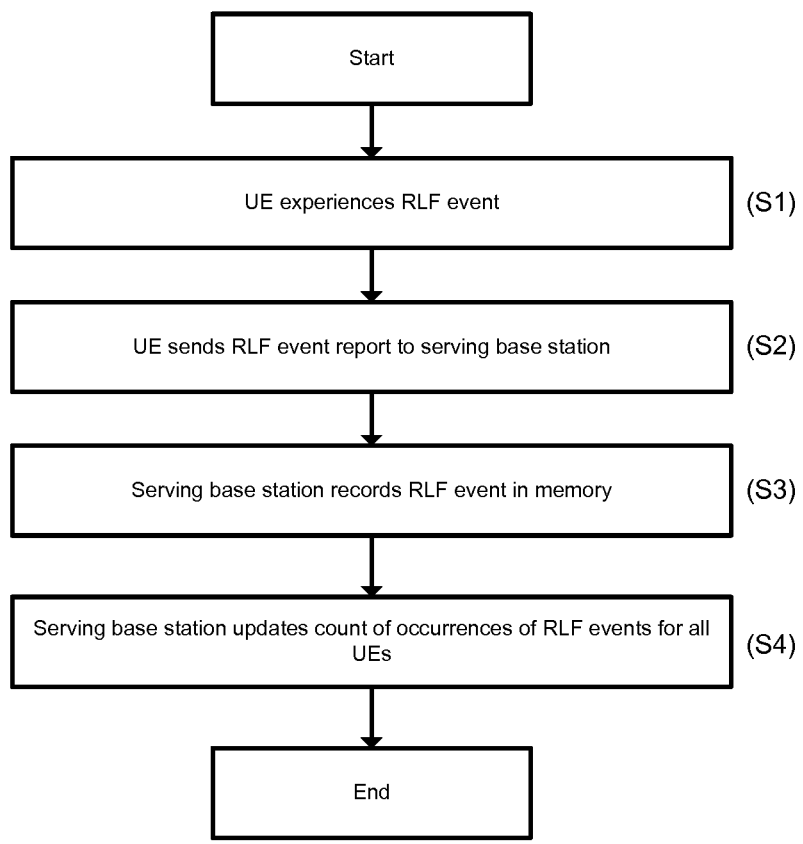
FIG. 7 is a flow diagram of a first process of a first embodiment of a method of the present disclosure.

In S1 of a first process of this first embodiment, as shown in FIG. 7, the plurality of UEs are served by the first base station 10 and a subset of UEs 30a . . . 30f pass through the tunnel (and therefore experience an RLF event). Once each UE of this subset of UEs re-emerges from the tunnel and reconnects to the first base station 10, they each report their RLF event to the first base station 10 (S2). The RLF event report includes an identifier for the UE sending the RLF event report and a timestamp of the RLF event. In S3, the first base station 10 stores the RLF event in memory 15 together with the associated UE identifier (e.g. IMSI) and the timestamp of the RLF event. This table is also used to store data on a location of the UE reporting the RLF event, which is initially populated with the previously reported location from the relevant UE (but may be updated following the remaining steps of this embodiment). An example data set is shown in the table below:

| RLF Event ID | UE ID | Timestamp | Associated Location |
| --- | --- | --- | --- |
| RLF$_1$ | IMSI (UE 30a) | t$_1$ | GPS Coordinates (RLF$_1$, UE 30a, t$_0$) |
| RLF$_2$ | IMSI (UE 30b) | t$_2$ | GPS Coordinates (RLF$_2$, UE 30b, t$_0$) |
| . . . | . . . | . . . | . . . |

It is noted that it is a prevailing condition in this embodiment that all UEs are configured to update their serving base station of any RLF event, such that any UE connected to the first base station 10 will report an RLF event occurring at any time to the first base station 10 and the first base station 10 will continue to record these RLF events in memory 15. The first base station 10 also maintains a count of occurrences of each reported RLF from any UE of the subset of UEs 30a . . . 30f (S4).

Figure 8:
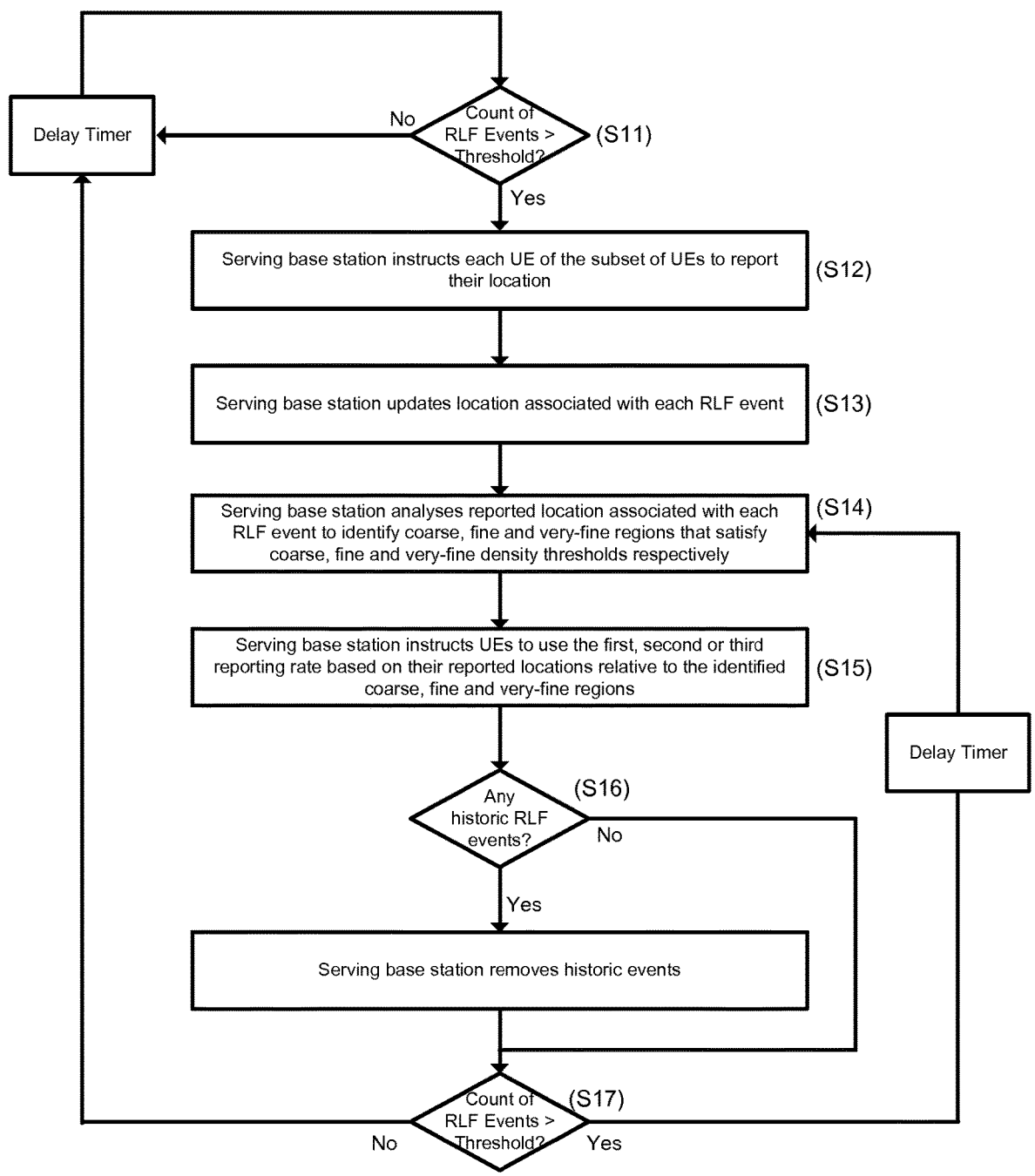
FIG. 8 is a flow diagram of a second process of the method of FIG. 7.

A second process will now be described with reference to FIG. 8. In S11, the first base station 10 determines if the count of occurrences of reported RLFs exceeds a threshold. If not, then the method loops back via a delay timer to check again at a subsequent time. In this example, the count of occurrences of reported RLFs exceeds the threshold and the method proceeds to S12.

In S12, the first base station 10 sends a first instruction message to each UE of the first subset of UEs 30a . . . 30f to report their instantaneous location. Each UE of the first subset of UEs 30a . . . 30f uses their GPS function to determine their location, and report their location to the first base station 10 (together with a timestamp indicating the time of the location determination).

In S13, the first base station 10 then determines which UE location report includes a timestamp which is closest in time to that of the RLF event report's timestamp. That is, if the timestamp of the UE location report in S12 (issued after the count of occurrences of RLFs exceeds a threshold) is closer to the RLF event's timestamp than the timestamp of the UE location report reported at the first reporting rate (prior to the count of occurrences of RLFs exceeding a threshold), then the timestamp of the UE location report of S12 is used (and vice versa). The first base station 10 then updates the value in the "Associated Location" field for each RLF Event in memory 15:

| RLF Event ID | UE ID | Timestamp | Associated Location |
| --- | --- | --- | --- |
| RLF$_1$ | IMSI (UE 30a) | t$_1$ | GPS Coordinates (RLF$_1$, UE 30a, t$_0$) |
| RLF$_2$ | IMSI (UE 30b) | t$_2$ | GPS Coordinates (RLF$_2$, UE 30b, t$_0$) |
| RLF$_3$ | IMSI (UE 30c) | t$_3$ | GPS Coordinates (RLF$_3$, UE 30c, t$_1$) |
| RLF$_4$ | IMSI (UE 30d) | t$_4$ | GPS Coordinates (RLF$_4$, UE 30d, t$_7$) |
| RLF$_5$ | IMSI (UE 30e) | t$_5$ | GPS Coordinates (RLF$_5$, UE 30e, t$_7$) |
| RLF$_6$ | IMSI (UE 30f) | t$_6$ | GPS Coordinates (RLF$_6$, UE 30f, t$_7$) |

In S14, the first base station 10 analyses the locations associated with each RLF event to determine if one or more of the coarse, fine and/or very-fine geographical regions of the first, second and third grids (as shown in FIGS. 4 to 6) meet or exceed a first, second and third density threshold respectively. This will now be explained in more detail for each of the first, second and third grids.

As shown in FIG. 4, the first base station 10 is configured to plot the GPS coordinates associated with each RLF event over the first grid. It can therefore be determined how many UEs that reported an RLF event are associated with locations that are in each of the coarse geographical regions (A to I) of the first grid. The first base station 10 then determines whether any one of these coarse geographical regions meets or exceeds a coarse density threshold, which is set to two RLF events per coarse geographical region. In this example, coarse geographical regions A and D satisfy this condition.

Turning to FIG. 5, the first base station 10 is also configured to plot the GPS coordinates associated with each RLF event over the second grid in order to determine how many UEs that reported an RLF event are associated with locations that are in each of the fine geographical regions (A1 to A4, D1 to D4). It is only necessary to perform this on the fine geographical regions that are within the coarse geographical region(s) that satisfy the coarse density threshold. The first base station 10 then determines whether any one of these fine geographical regions meets or exceeds a fine density threshold, which is set to two RLF events per fine geographical region. In this example, fine geographical region D4 satisfies this condition.

Turning to FIG. 6, the first base station 10 is also configured to plot the GPS coordinates associated with each RLF event over the third grid in order to determine how many UEs that reported an RLF event are associated with locations that are in each of the very-fine geographical regions (D4.1 to D4.4). It is again only necessary to perform this on the very-fine geographical regions that are within the fine geographical region(s) that satisfy the fine density threshold. The first base station 10 then determines whether any one of these very-fine geographical regions meets or exceeds a very-fine density threshold, which is set to two RLF events per very-fine geographical region. In this example, none of the very-fine geographical regions satisfies this condition.

Accordingly, following the first iteration of S14, the first base station 10 determines that coarse geographical regions A and D meet the coarse density threshold, fine geographical region D4 meets the fine density threshold, and none of the very-fine geographical regions meet the very-fine density threshold.

In S15, the first base station 10 sends an instruction message to each UE of the first subset of UEs 30a . . . 30f, which instructs them to report their location to the first base station 10 at either the first, second or third reporting rate. The determination of whether a UE should report its location at the first, second, or third reporting rate is based on the following logic:
1. Is the UE's reported location associated with its last RLF event within a very-fine geographical region that satisfies the very-fine density threshold? If so, trigger a blind handover according to a process of a second embodiment (described below). If not,
2. Is the UE's reported location associated with its last RLF event within a fine geographical region that satisfies the fine density threshold? If so, use the third reporting rate. If not,
3. Is the UE's reported location associated with its last RLF event within a coarse geographical region that satisfies the coarse density threshold? Is so, use the second reporting rate. If not,
4. Use the first reporting rate.

In this embodiment, the first reporting rate is one location report every ten minutes, the second reporting rate is one location report every minute, and the third reporting rate is one location report every 10 seconds. Thus, following the first iteration of S14, the reporting rate for the first and second UE 30a, 30b is set at the second reporting rate, the reporting rate for the third and fourth UEs 30c, 30d is set at the third reporting rate, and the reporting rate for the fifth and sixth UEs 30e, 30f continues at the first reporting rate. The seventh and eighth UEs 30g, 30h also continue to use the first reporting rate.

The purpose of identifying a very-fine geographical region that satisfies a very-fine density threshold will become clear upon review of the process of the second embodiment of the invention, described below. Turning back to the second process, the first base station 10 maintains a table, in memory 15, of the reporting rate of all connected UEs, thus:

| UE ID | Reporting Rate |
|---|---|
| 30a | $2^{nd}$ Reporting Rate |
| 30b | $2^{nd}$ Reporting Rate |

-continued

| UE ID | Reporting Rate |
|---|---|
| 30c | $3^{rd}$ Reporting Rate |
| 30d | $3^{rd}$ Reporting Rate |
| 30e | $1^{st}$ Reporting Rate |
| . . . | . . . |
| 30h | $1^{st}$ Reporting Rate |

The second process is then configured to loop back to either S11 or S14. The decision logic will be explained later in the description, but for now it is assumed the process loops back to S14. As the process passes through a delay timer between iterations, the first base station 10 continues to receive RLF event reports from any UE that has experienced an RLF event, and further receives the location of UEs 30a . . . 30h at the first, second, or third reporting rate. The first base station 10 may then associate a location report with an RLF report for a particular UE based on their respective timestamps such that the location report which was determined in the smallest time interval (before or after) the RLF event is used as the "associated location" of the RLF event. It is noted that a UE of the plurality of UEs but not of the first subset of UEs, (i.e. it did not report an RLF event prior to the first iteration of the second process), or any new UE which has subsequently connected to the first base station 10, may now have reported an RLF event, in which case that RLF event will also be considered in the identification of the coarse, fine and very-fine regions in the second iteration of the second process. Furthermore, any UE location report (at the first, second or third reporting rate) indicating that it has moved to a region of different size (e.g. coarse to fine, or fine to coarse) will cause the UE to change its location reporting rate to that associated with its new region. In this example, the data set stored in memory 15 at the first base station 10 after the delay timer has elapsed is:

| RLF Event ID | UE ID | Timestamp | Associated Location |
|---|---|---|---|
| $RLF_1$ | IMSI (UE 30a) | $t_1$ | GPS Coordinates ($RLF_1$, UE 30a, $t_0$) |
| $RLF_2$ | IMSI (UE 30b) | $t_2$ | GPS Coordinates ($RLF_2$, UE 30b, $t_0$) |
| $RLF_3$ | IMSI (UE 30c) | $t_3$ | GPS Coordinates ($RLF_3$, UE 30c, $t_1$) |
| $RLF_4$ | IMSI (UE 30d) | $t_4$ | GPS Coordinates ($RLF_4$, UE 30d, $t_7$) |
| $RLF_5$ | IMSI (UE 30e) | $t_5$ | GPS Coordinates ($RLF_5$, UE 30e, $t_7$) |
| $RLF_6$ | IMSI (UE 30f) | $t_6$ | GPS Coordinates ($RLF_6$, UE 30f, $t_7$) |
| $RLF_7$ | IMSI (UE 30a) | $t_8$ | GPS Coordinates ($RLF_7$, UE 30a, $t_{10}$) |
| $RLF_8$ | IMSI (UE 30c) | $t_9$ | GPS Coordinates ($RLF_8$, UE 30c, $t_{11}$) |
| . . . | . . . | . . . | . . . |

Figure 9:
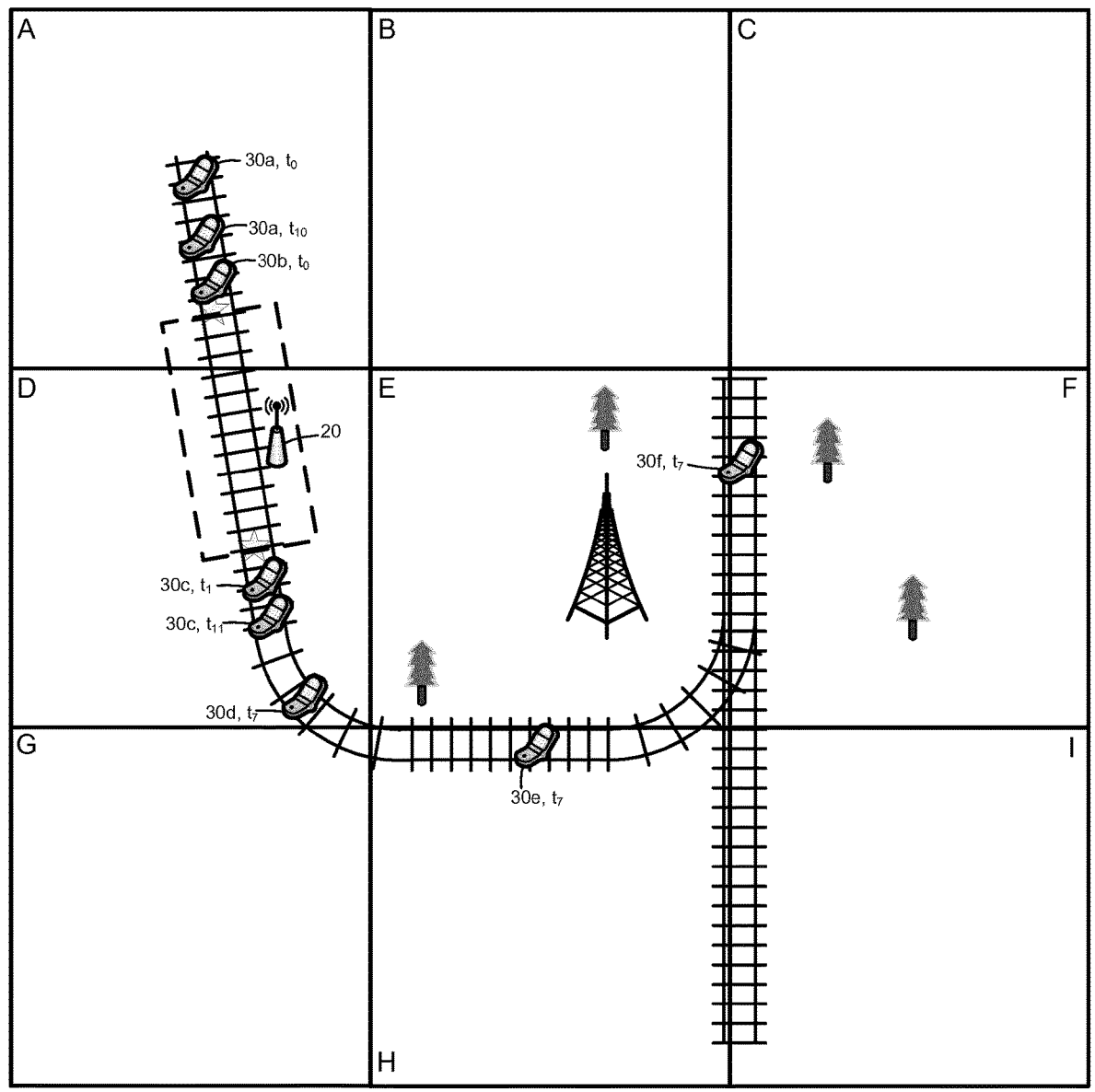
FIG. 9 is a schematic diagram of the network of FIG. 1, showing locations of RLF events overlaid onto the first grid.
Figure 10:
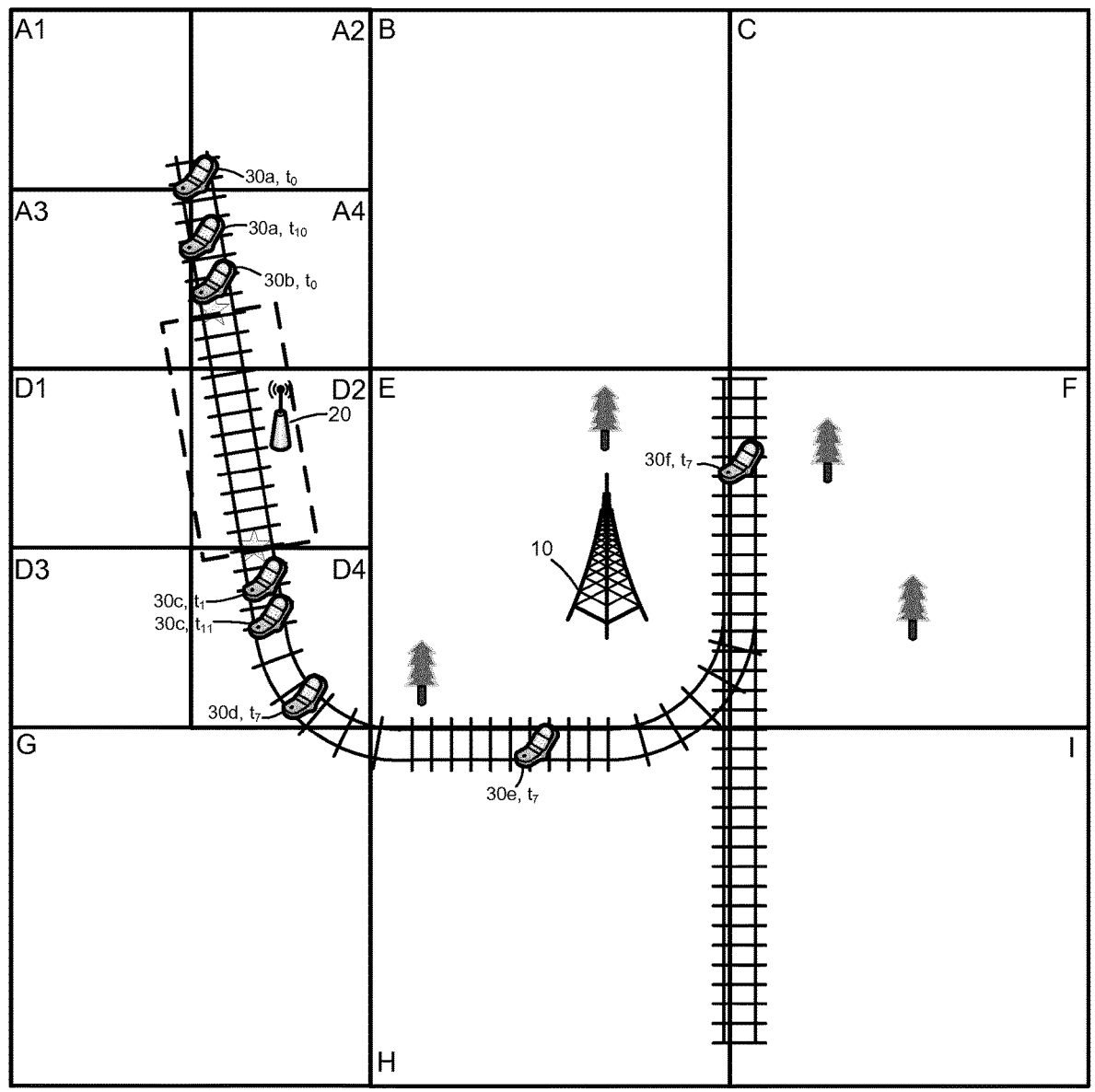
FIG. 10 is a schematic diagram of the network of FIG. 1, showing locations of RLF events overlaid onto the first and second grids.
Figure 11:
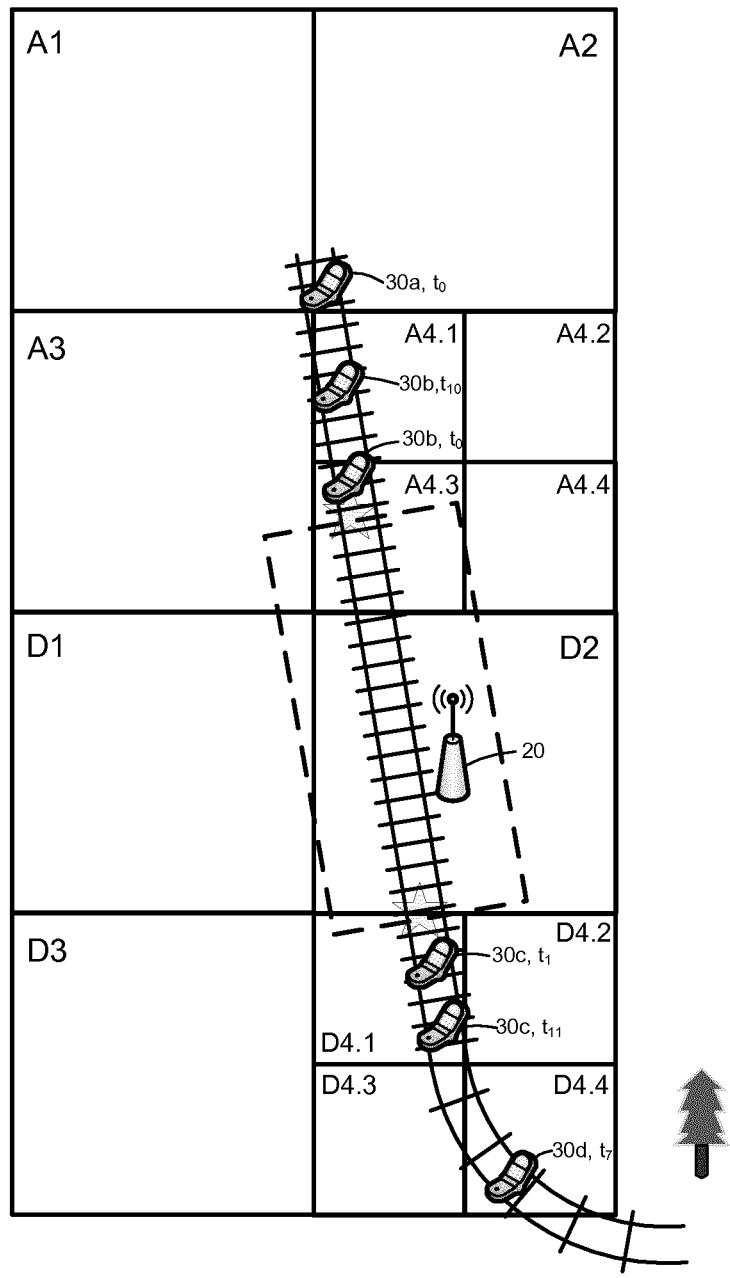
FIG. 11 is a schematic diagram of the network of FIG. 1, showing locations of RLF events overlaid onto the first, second and third grid.

On the second iteration of S14, the first base station 10 again plots the GPS coordinates associated with each RLF event on the first, second and third grids. These are shown in FIGS. 9, 10 and 11 respectively. As shown in FIG. 9, coarse geographical regions A and D again satisfy the coarse density threshold; as shown in FIG. 10, fine geographical regions A4 and D4 satisfy the fine density threshold; and as shown in FIG. 11, very-fine geographical region D4.1 satisfies the very-fine density threshold.

In the second iteration of S15, the first base station 10 sends an instruction message to the first, second, third, and fourth UEs to update their location reporting rates using the logic set out above (in the first iteration of S15). The logic sets the reporting rate based on the reported location associated with the UE's last RLF event. For example, UE 30a has reported two RLF events ($RLF_1$, $RLF_7$) at time $t_1$ and time $t_8$ ($t_8$ occurring after $t_1$), so the first base station 10 determines the reporting rate for UE 30a based on its reported location (GPS Coordinates ($RLF_7$, UE 30a, $t_{10}$)) associated with $RLF_7$.

The first base station 10 also updates its location reporting rate table, thus:

| UE ID | Reporting Rate |
|---|---|
| 30a | $3^{rd}$ Reporting Rate |
| 30b | $3^{rd}$ Reporting Rate |
| 30c | $3^{rd}$ Reporting Rate (see second embodiment below) |
| 30d | $3^{rd}$ Reporting Rate |
| 30e | $1^{st}$ Reporting Rate |
| ... | ... |
| 30h | $1^{st}$ Reporting Rate |

It can be seen that the method of this embodiment increases the reporting rate of a UE if it is associated with a geographical region with a greater density of RLF events. In doing so, it is more likely an RLF event report from a UE in that geographical region will report its location within a shorter timescale of the RLF event (as the reporting rate is greater) and is therefore more accurate. By performing this method across many UEs, it is possible to identify successively narrower geographical regions around the location of the cause of an RLF event (e.g. a tunnel), in which the location reporting rate of the UEs increases as they move into narrower regions. It is also noted that this method strikes a balance between the urgency of collecting location data for each UE (in order to accurately plot the location of an RLF event) with the power consumption required for UEs to frequently report their locations (due to the use of processing and radio resources).

Following each iteration of the second process, the method loops back to either S11 or S14. This will now be explained in more detail. Once the first base station 10 has set the location reporting frequency for each UE, it is determined in S16 whether any data is now too old to be relevant. That is, each data tuple in the RLF event table above is associated with a time period (e.g. one hour), after which the RLF event is considered historic. In this example, RLF events $RLF_1$, $RLF_2$ and $RLF_3$ are considered historic, whereas RLF events $RLF_3$ to $RLF_8$ are still valid.

In S17, the first base station 10 determines if the count of occurrences of RLF events (excluding historic events) is still greater than the threshold (used in S11). If so, then the method loops back to S14 for a further iteration. It is noted that this further iteration no longer considers the historic RLF events, which may change the determination of whether each of the coarse, fine and very-fine geographical regions satisfies the relevant thresholds. Thus, the reporting rates of each UE may dynamically increase or decrease following each iteration.

If S17 results in a negative determination such that the count of occurrences of RLF events is now less than the threshold, then the method loops back to S11 in which the first base station 10 periodically checks whether a subsequent count of RLF events exceeds a threshold. It is noted that upon a new positive determination that the count of RLF events exceeds a threshold, the first base station 10 then requests the instantaneous location of all UEs that have reported an RLF event.

Figure 12:
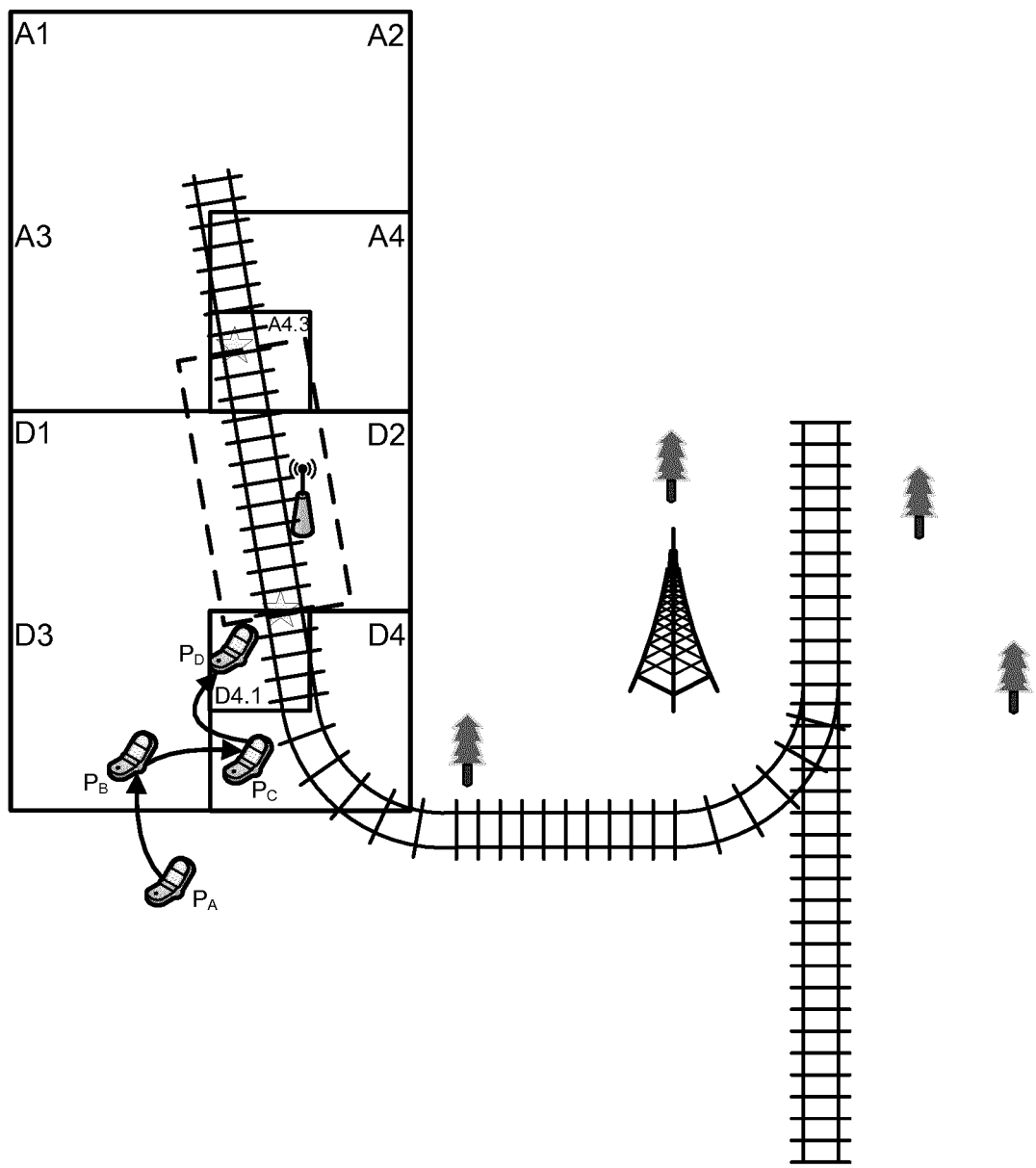
FIG. 12 is a schematic diagram of the network of FIG. 1, illustrating the movement of a User Equipment.

A process of a second embodiment of the invention will now be described with reference to FIGS. 12 and 13. Following the second process outlined above, the first base station 10 identified two coarse geographical regions (A and D) as satisfying a coarse density threshold, two fine geographical regions (A4, D4) as satisfying a fine density threshold, and a very-fine geographical region (D4.1) as satisfying a very-fine density threshold.

In this embodiment, these coarse, fine and very-fine geographical regions are also used to determine a suitable time to trigger a handover of any UE connected to the first base station 10. This will be described in the scenario of a UE moving from position $P_A$ to $P_B$ to $P_C$ and finally to $P_D$ (as shown in FIG. 12).

Figure 13:
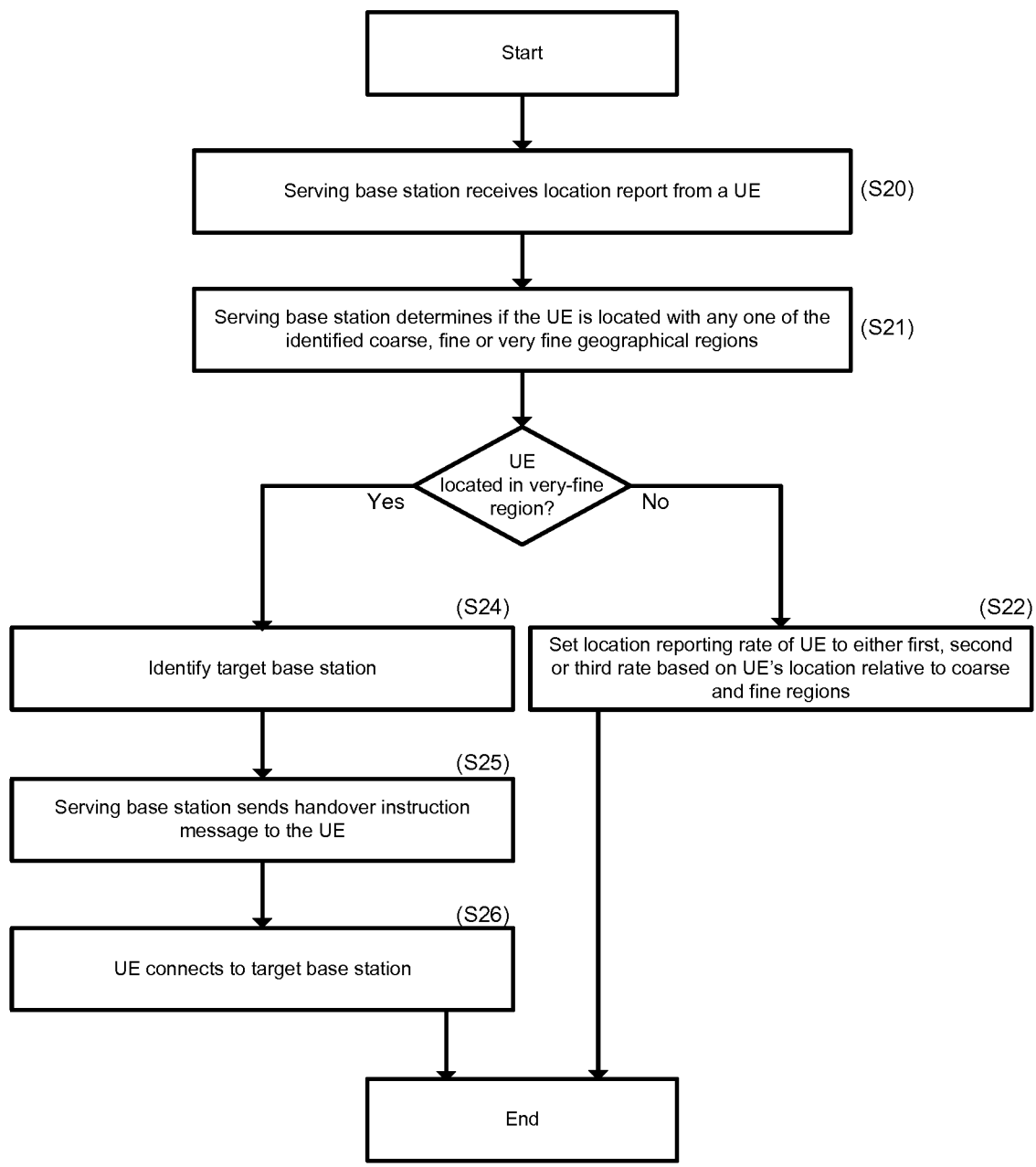
FIG. 13 is a flow diagram of a process of a second embodiment of a method of the present disclosure.

In S20 of the flow diagram of FIG. 13, the first base station 10 receives a first location report from the UE. This location report may have been initiated by virtue of the first embodiment above, or may have been initiated by any other means (e.g. by manual intervention by a network planner upon learning that the UE is positioned nearby an RLF event).

In S21, the first base station 10 plots the GPS coordinates of the UE from the first location report against the first, second and third grids to determine if the UE is located within any one of the identified coarse, fine or very-fine geographical regions. In this first scenario in which the UE is at position $P_A$, this determination is negative. The first base station 10 updates its UE reporting rate table (in memory 15) to indicate that the UE reporting rate is the first reporting rate (S22). The UE therefore continues to send a new location report to the first base station 10 every ten minutes. This first iteration of the process then ends.

In a second iteration of S20 of the third process, the first base station 10 receives a second location report from the UE indicating that the UE is now in position $P_B$. In S21, the first base station plots the new GPS coordinates of the UE from the second location report against the first, second and third grids and determines that the UE is positioned within an identified coarse geographical region (D). In response, in S22, the first base station 10 sends an instruction message to the UE indicating that it should use the second reporting rate, and the first base station 10 updates its UE reporting rate table in memory 15 to reflect this. Thereafter, the UE is configured to send a new location report to the first base station 10 every one minute. The second iteration of the process then ends.

In a third iteration of S20 of the third process, the first base station 10 receives a third location report from the UE indicating that the UE is now in position $P_C$. In S21, the first base station 10 plots the new GPS coordinates against the first, second and third grids and determines that the UE is now positioned within an identified fine geographical region (D4). In response, in S22, the first base station 10 sends an instruction message to the UE indicating that it should use the third reporting rate, and the first base station 10 updates its UE reporting rate table in memory 15. Thereafter, the UE is configured to send a new location report to the first base station 10 every 10 seconds. This third iteration of the process then ends.

In a fourth iteration of S20 of the third process, the first base station 10 receives a fourth location report from the UE indicating that the UE is now in position $P_D$. In S21, the first base station plots the new GPS coordinates of the UE from the fourth location report against the first, second and third grids and determines that the UE is positioned within a very-fine geographical region (D4.1). The first base station 10 is configured to respond to such a determination by initiating a blind handover of the UE. Accordingly, in S24, the first base station 10 determines which other base station in the cellular network should be the target base station for the handover. This may be based on a known location of other base stations (e.g. GPS coordinates) indicating that it is close to position $P_D$, or may be based on historical data indicating how successful blind handovers of UEs in that position to that target base station have been in the past.

In this embodiment, the first base station 10 selects the second base station 20 as the target base station, and, in S25, sends a handover instruction message to the UE, indicating that it should connect to the second base station 20. The handover instruction message also indicates that the UE should send location reports at the third reporting rate. In S26, the UE connects to the second base station 20 and the blind handover is complete.

Accordingly, this process is advantageous in that a UE may perform a blind handover to a target base station based on its location, in which the overall UE radio and/or processing resources to determine when the UE is in a position for a blind handover are reduced by only increasing its location reporting rate as it approaches such a location.

In the above embodiments, each UE includes a GPS function in order to estimate their location and provide a location report to the serving base station. However, the skilled person will understand that this is non-essential, and other forms of positioning schemes, such as OTDOA may be used. Furthermore, the UEs are configured to measure their radio environment to determine if they are experiencing an RLF event, and record and report such an occurrence. However, again, this is non-essential. Any other form of measurement of the connection performance which would deteriorate at locations where a blind handover should be performed would be suitable.

In the second process of the above embodiment, the UEs emerge from the tunnel and reconnect to the first base station, such that the first base station then receives the RLF event report. However, this is non-essential. That is, following an RLF event, each UE may report the RLF event to any subsequent serving base station, and that serving base station may then forward this RLF event report to the base station that was serving the UE at the time of the RLF event (which may then carry out the remaining steps of the second process). The base station may also note the next serving base station as a candidate target base station for a future blind handover (in the second embodiment of the invention). Alternatively, each base station in the network may forward each RLF event report to a centralized network node, which collates the information of all RLF events for all UEs connected to all base stations in the network, and thereafter perform the remaining steps of the second process of the first embodiment.

Furthermore, in the second process outlined above, the first base station instructs the UEs to report their locations following a trigger condition that the count of occurrences of RLF events exceeds a threshold. The skilled person will understand that other forms of trigger event (such as a rate of occurrences of RLF events) may be used instead.

It is also non-essential that the cellular network is divided into the particular number of geographical regions identified below, and the method may be implemented with any number of successively smaller regions. Furthermore, the regions may be of any shape, but square was used in the above examples for simplicity. The skilled person will also understand that the use of two-dimensional geographical regions is unnecessary in the process of the second embodiment above, and the UE's reporting rates may be based on distance alone. That is, once a location associated with an RLF event has been identified (e.g. as any location within the very-fine geographical region), then the UE reporting rate may then be based on the distance from the very-fine geographical region (in which the reporting rate increases for UEs which are closer to the very-fine geographical region).

The skilled person will understand that any combination of features is possible within the scope of the invention, as claimed.

The invention claimed is:

1. A method in a cellular telecommunications network, the cellular telecommunications network including a base station having a coverage area, and further including a plurality of User Equipment (UE) located within the coverage area of the base station, the method comprising:
   instructing a first plurality of UEs each to report a respective location of the UE;
   associating an occurrence of a connection performance indication for each UE of the first plurality of UEs with a reported location for that UE;
   defining a first geographical region in which a density of reported locations is above a first density threshold;
   defining a second geographical region in which a density of reported locations is above a second density threshold, wherein an area of the first geographical region is greater than an area of the second geographical region;
   instructing a second plurality of UEs within the first geographical region each to report a respective location at a first reporting rate; and
   instructing a third plurality of UEs within the second geographical region each to report a respective location at a second reporting rate.

2. The method as claimed in claim 1, further comprising, initially, determining that a count of occurrences of connection performance indications for one or more UEs of the plurality of UEs satisfies a threshold.

3. The method as claimed in claim 1, wherein the connection performance indication is a Radio Link Failure (RLF).

4. The method as claimed in claim 1, performed by a first base station.

5. The method as claimed in claim 1, performed by a network node, wherein the network node is in communication with one or more base stations.

6. A non-transitory computer-readable storage medium storing a computer program comprising instructions which, when the computer program is executed by a computer, cause the computer to carry out the method of claim 1.

7. A system comprising:
   at least one processor and memory having stored thereon a computer program which, when executed, causes the at least one processor and memory to, in a cellular telecommunications network, the cellular telecommunications network including a base station having a coverage area, and further including a plurality of User Equipment (UE) located within the coverage area of the base station:
   instruct a first plurality of UEs each to report a respective location of the UE;
   associate an occurrence of a connection performance indication for each UE of the first plurality of UEs with a reported location for that UE;

define a first geographical region in which a density of reported locations is above a first density threshold;

define a second geographical region in which a density of reported locations is above a second density threshold, wherein an area of the first geographical region is greater than an area of the second geographical region;

instruct a second plurality of UEs within the first geographical region each to report a respective location at a first reporting rate; and instruct a third plurality of UEs within the second geographical region each to report a respective location at a second reporting rate.

8. A network node for a cellular telecommunications network, the cellular telecommunications network including a plurality of User Equipment (UE) the network node comprising:

a transceiver configured to receive data from the plurality of UEs;

memory configured to store the data; and a processor configured to:
instruct a first plurality of UEs each to report a respective location of the UE;
associate an occurrence of a connection performance indication for each UE of the first plurality of UEs with a reported location for that UE;
define a first geographical region in which a density of reported locations is above a first density threshold;
define a second geographical region in which a density of reported locations is above a second density threshold, wherein an area of the first geographical region is greater than an area of the second geographical region;
instruct a second plurality of UEs within the first geographical region each to report a respective location at a first reporting rate; and
instruct a third plurality of UEs within the second geographical region each to report a respective location at a second reporting rate.

9. The network node as claimed in claim 8, wherein the network node is a base station.

* * * * *